United States Patent [19]

Ward, Jr.

[11] Patent Number: 4,927,272
[45] Date of Patent: May 22, 1990

[54] LINEAR BEARING WITH IMPROVED LUBRICATION SYSTEM AND METHOD

[75] Inventor: Robert E. Ward, Jr., Charlotte, N.C.

[73] Assignee: The Warner & Swasey Company, Cleveland, Ohio

[21] Appl. No.: 355,262

[22] Filed: May 22, 1989

[51] Int. Cl.⁵ .............................................. F16C 29/06
[52] U.S. Cl. ...................................... 384/13; 384/15; 384/45; 184/105.3
[58] Field of Search ........................ 384/13, 45, 15, 16, 384/473, 53, 44; 184/5, 100, 105.1, 105.3

[56] References Cited

U.S. PATENT DOCUMENTS

| | | | |
|---|---|---|---|
| 2,754,110 | 7/1956 | Wissman | 184/5 |
| 4,479,681 | 10/1984 | Suzuki | 384/13 |
| 4,615,569 | 10/1986 | Hirata | 384/45 |
| 4,730,945 | 5/1988 | Luther et al. | 384/44 |
| 4,828,402 | 5/1989 | Osawa | 384/45 |
| 4,850,720 | 7/1989 | Osawa | 384/13 |

Primary Examiner—Lenard A. Footland
Attorney, Agent, or Firm—John R Benefiel; Raymond J. Eifler

[57] ABSTRACT

A linear bearing installation in which a plurality of linear bearings (20) are mounted in a series of recesses (18) formed in a structure (12) to be supported on a way surface (38), the position of each of the bearings (20) in the respective recess (18) adjustable lengthwise by an adjustment mechanism (58). A lubrication system is provided to direct lubricant to each bearing (20) by an injector assembly (60) mounted in an endwalls (88) of the structure (12) adjacent each bearing (20) and having an injector tube (96) telescoped into a receptor (98) on the bearing to accommodate the lengthwise adjustment. A wiper cover (36a) is formed with a supply channel (108) feeding lubricant from a single quick connect fitting (114) to all of the lubricant injector assemblies (60).

6 Claims, 4 Drawing Sheets

LINEAR BEARING WITH IMPROVED LUBRICATION SYSTEM AND METHOD

SPECIFICATION

This invention concerns linear bearings of the type described in U.S. Pat. No. 4,730,945 issued on Mar. 15, 1988 for Integrally Adjustable Way Bearings, with a lubrication system for directing lubricant to the bearing.

It is conventional practice to provide for the flow of lubricant to bearings used in heavy duty precision applications, such as in machine tools to reduce friction and wear. Where such bearings are used in machine tools or similar equipment, the usual practice has been for each bearing to be separately plumbed for lubrication, a time consuming and costly step in the manufacture of the equipment. The resulting plumbing network is complex and difficult to service, as for clogged metering and filter elements.

In the aforementioned U.S. Pat. No. 4,730,945, lubricant is directed into a slotted opening formed in an upper bearing housing which communicates with a pair of passage opening adjacent each of a series of rollers recirculating about a track. The bearing is adjustable lengthwise, and the slot accommodates the shift in position while maintaining communication with a supply port formed in the mounting structure for the bearing. However, individual plumbing connections for each bearing and extensive internal passages to each port are necessitated.

SUMMARY OF THE INVENTION

The present invention is directed to a linear bearing with an improved lubrication system including a lubrication injector assembly, with an injector assembly provided for each bearing in a multiple bearing installation. Each lubrication injector assembly is threadably mounted in a bore in the bearing mounting structure aligned and directed toward a respective bearing, which injector carries a mating lube receptor fitting directing lubricant via short internal passages in the bearing housing to the points to be lubricated. The lubrication injector assembly includes an injector tube slidably fit into the receptor fitting so as to accommodate shifting movement of the bearing occuring during height adjustments by an adjustment mechanism.

Each injector assembly is supplied with lubricant via a supply channel let into the inside face of a wiper cover secured to one face of the mounting structure, the supply channel extending to each of a series of holes in the wiper cover. Each hole receives an injector assembly housing, which has a shoulder seated against the wiper cover outer plate with an interposed sealing gasket. A series of passages are machined into the injector housing shoulder, each communicating with the interior of the injector housing and the supply channel via a clearance space between the hole in the wiper plate and the main body of the injector housing. A lubricant supply tube directs lubricant into the channel via a single quick connect fitting mounted into a supply chamber located beneath the wiper plate and along the supply channel.

Each injector assembly housing receives a filter material unit which can be serviced by removal of a cap accessible from the exterior of the mounting structure.

The present invention has the advantage of being located to the outside of the bearing but accommodating the shifting position of the bearing occurring during height adjustments. The lubrication system has the further advantage of allowing the plumbing connection for an array of bearings to be made with a single supply tube and quick connect fitting, to greatly simplify the steps necessary to incorporated the bearings into a piece of equipment.

The lubrication system is trouble free, but is easily serviceable and simplifies manufacture of each individual bearing as well as its installation.

DETAILED DESCRIPTION

Figure 1:
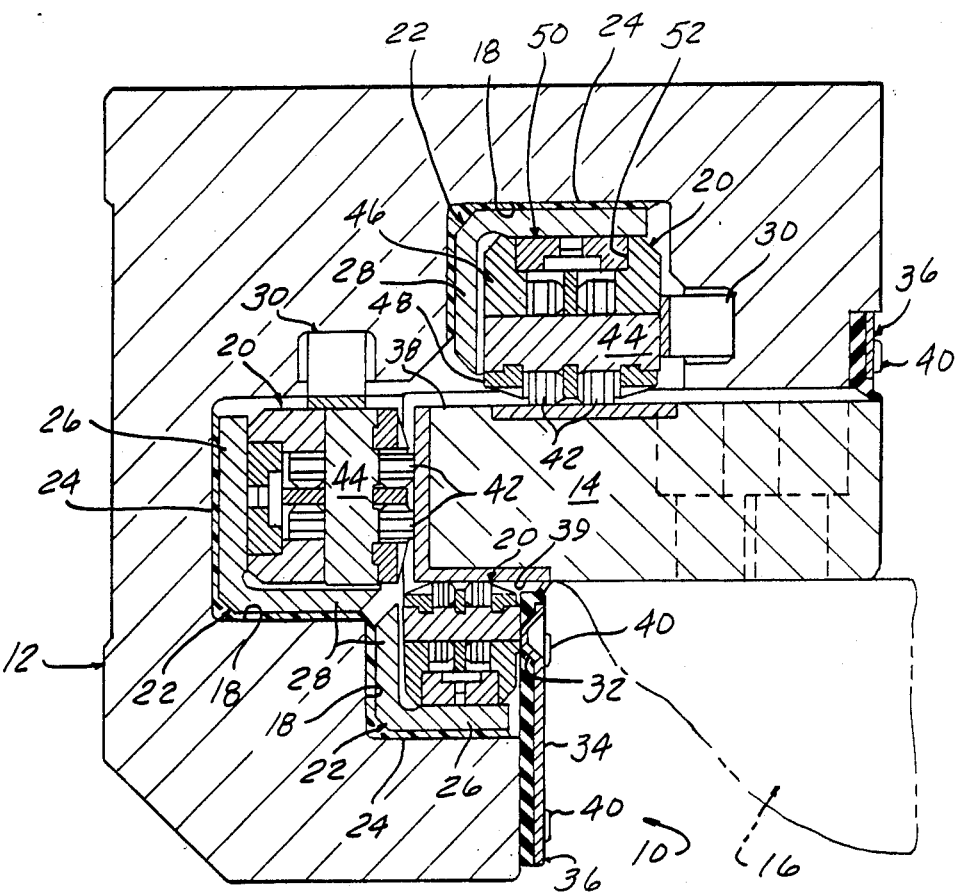
FIG. 1 is a transverse sectional view through an installation of several linear bearings in a structure, and the mating way member.

FIG. 1 shows a linear bearing installation 10, in which a structure 12 is supported on way 14 attached to a base 16. The structure 12 is formed with an array of recesses 18 into each of which a separate roller bearing 20 is received. According to the teachings of U.S. Pat. No. 4,730,945, an angled gib plate 22 is bedded in a mass of epoxy 24 to precisely align the inner surfaces of an aligned side 26 and a lateral side 28 of each gib plate 22. Each bering 20 is urged against the inner surface of respective lateral side 28 by a spring force generated by flat springs 30 and a proturberance 32 formed in the backing plate 34 of one of the wiper covers 36 attached with screws 40 to structure 12 to eliminate the entrance of dirt or other foreign material into the bearings 20 and wipe the way surfaces 38 on which the structure 12 is supported.

Each bearing 20 includes two series of rollers 42 circulating around the perimeter of a track member 44, and confined by an upper housing piece 46 attached to a lower cover 48 of molded plastic. A plug 50 is inserted in an opening 52 formed into the top of the upper housing piece 46, which is utilized to conveniently allow installation of the rollers 42 after assembly of the housing piece 46 and lower cover 48, as well as to provide an alternate lubrication port for applications which do not utilize the lubrication system according to the present invention described herein.

Figure 2:
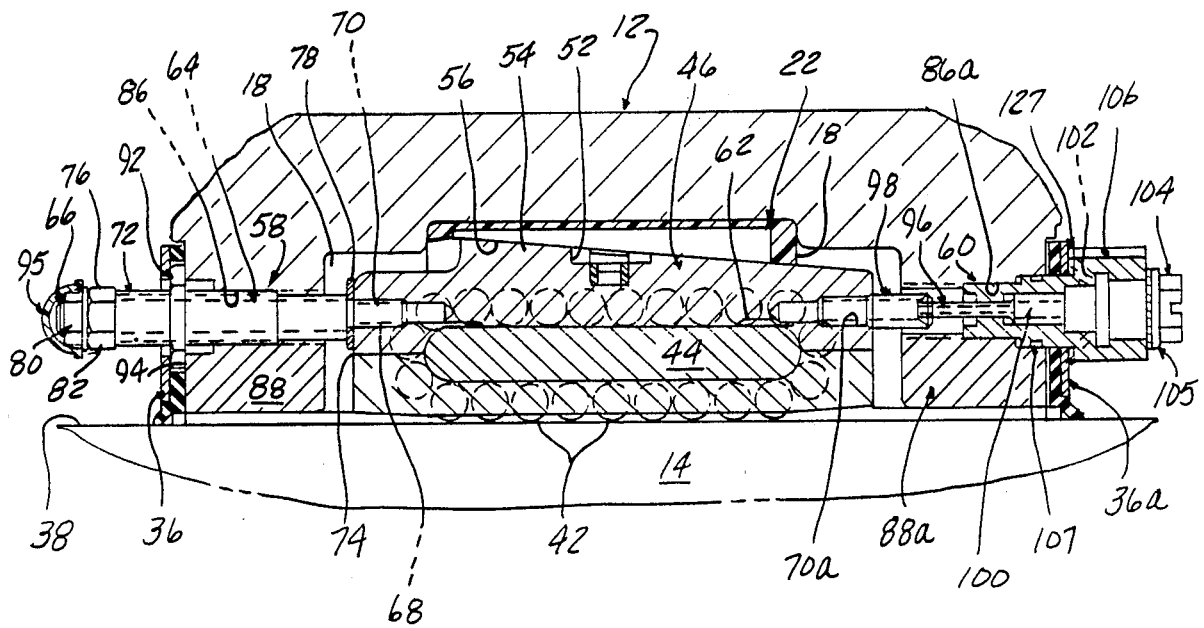
FIG. 2 is a rear end view of the installation shown in FIG. 1, showing the end wiper and lubrication system components.

FIG. 2 shows that the top surface 54 of the upper housing piece 46 slopes complementarily to the sloping of the inner surface 56 of the aligned side 26 of the angled gib plate. Thus, as the bearing assembly 20 is advanced or retracted lengthwise by an adjustment mechanism 58, the height of the bearing assembly 20 is varied, as to achieve a desired preload or precise location. A lubricant injector assembly 60 is associated with each bearing 20, and supplies lubricant to a transverse clearance space 62 between the upper housing piece 46 and the track 44 to direct lubricant to each series of rollers 42.

The adjustment mechanism 58 is described more completely and claimed in copending U.S. application Ser. No. 354,958 filed on 5-22-89.

The components of the adjustment mechanism 58 include an elongated stud 64 threaded at either end 66, 68, the end 68 received in a threaded bore 70 at one end of the upper housing piece 46 to be secured thereto, with adjacent wrenching flats 77 formed thereon to facilitate installation. The exposed length of the stud 64 is received within a tubular elongated bushing 72 abutting against the end face 74 of the upper housing piece 46 with an intermediate thrust washer 78, the one threaded end 66, of the stud 64 protrudes beyond the outboard end of the bushing 72, formed with a hex wrenching shape 76. A stud reaction nut 80 of the self locking type is advanced against the face of bushing outboard end 76 with an intermediate thrust washer 82 so as to be snug but allow rotation of the bushing 72. The bushing 72 is threaded along its outside diameter for a section 84 adjacent wrenching hex 76 section which is received in a threaded bore 86 extending through an end wall 88 of the structure 12 defining in part the bearing recess 18. The outside diameter section 90 of the bushing 72 adjacent the opposite end is unthreaded and slidably fit within the threaded bore 86. A large diameter locking nut 92 is threaded over the threaded section 84 of the bushing outside diameter, which may be advanced against the face 94 of end wall 88 to secure the bushing 72 in any adjusted position.

Each lubricant injector assembly 60 includes an adaptor housing 106 received in threaded bore 86a machined into end wall 88a of structure. An injector tube 96 is telescoped into a lube receptor 98 threaded into bore 70a, of injector tube 96 slip fit in the receptor 98 accommodating the lengthwise movement of the bearing 20 undergone during the above described height adjustment. The injection tube 96 receives lubricant under pressure from a metering-filter element 100 in turn fed via passages 102 in adaptor housing 106 communicating with a supply channel (not shown in FIG. 2) in the wiper cover 36. A threaded end cap 104 and gasket 105 seals off the interior of the adaptor housing 106.

The filter-meter element 100 is itself a commercially available item, containing a screen and metering orifice. A commercial item BIJUR CSA No. 3/2 B-7024 has been successfully employed. Each element 100 is easily serviced by removal of the cap 104.

Figure 3:
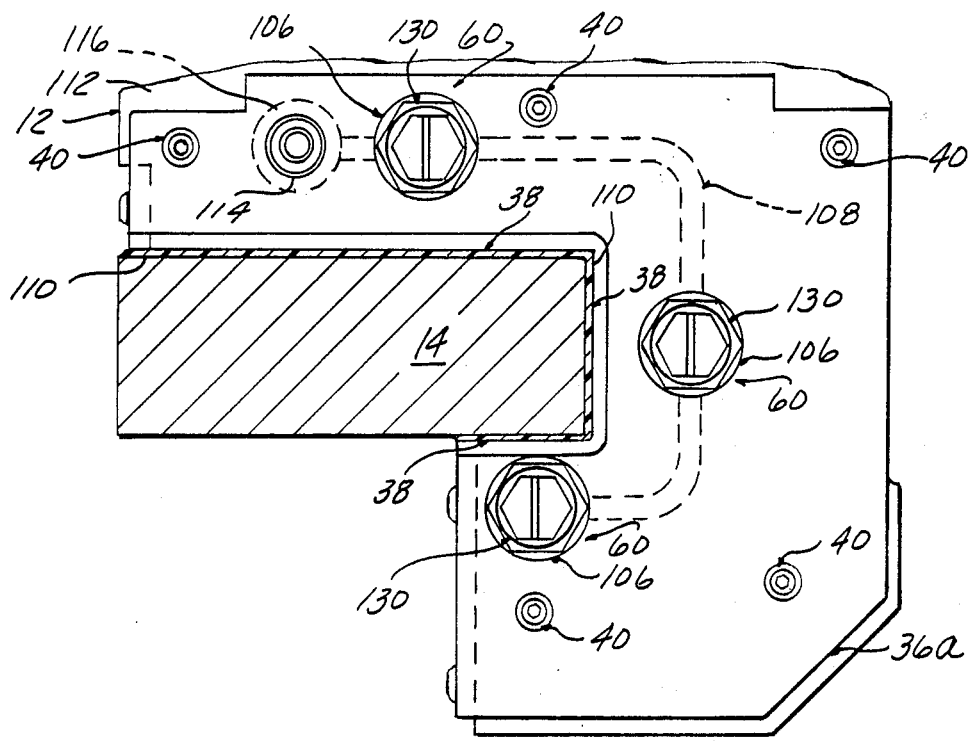
FIG. 3 is a longitudinal section view taken through the bearing installation of FIG. 1.

FIG. 3 shows the placement of each injector assembly 60 is along a supply channel 108 formed in the wiper cover 36a located at the end of the bearing installation 10 adjacent one end of the bearings 20. The wiper cover 36a overlies each way surface 38, with one of a series of lips 110 pressed against each way surface 38. The wiper cover 36a is attached to the outer face 112 of the end wall 88a of structure 12 by the series of capscrews 40.

The supply channel 108 is itself supplied with lubricant by means of a quick connect fitting 114 communicating with a supply chamber 116 machined into end wall 88a.

Figure 4:
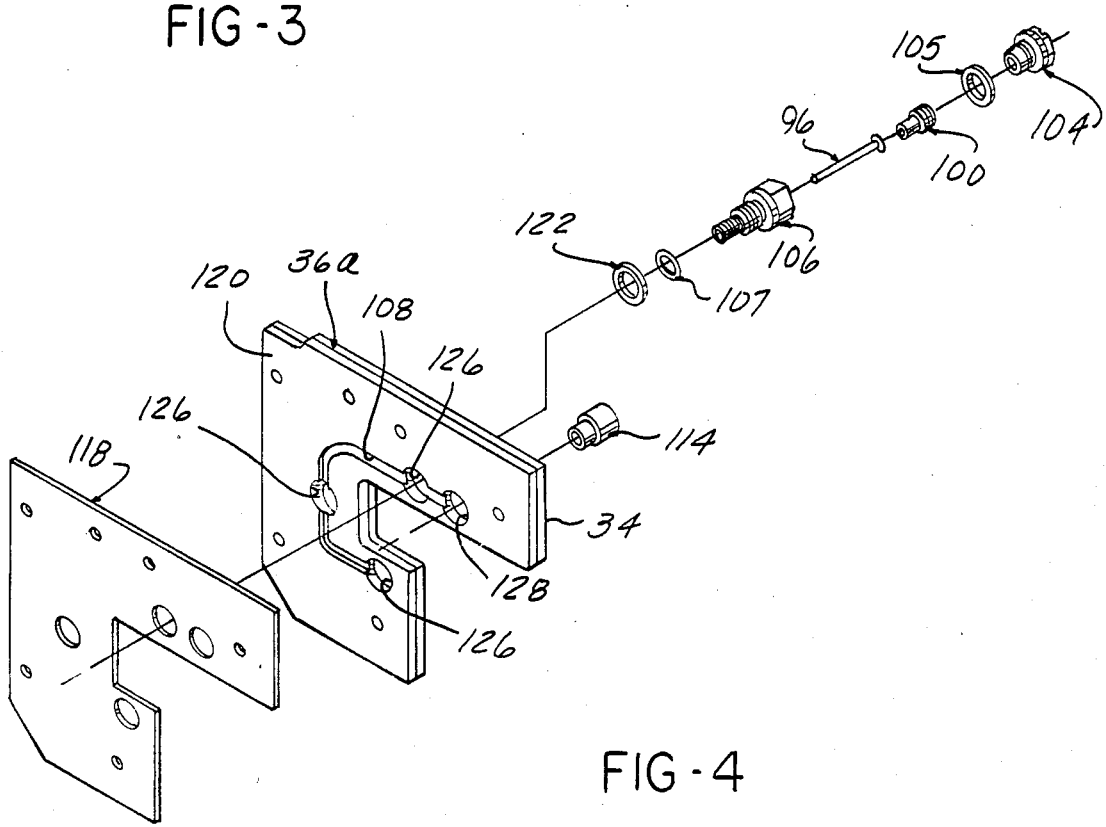
FIG. 4 is an exploded perspective view of the lubrication system components incorporated in the installation of FIGS. 1-3.

FIG. 4 shows that a gasket 118 lies beneath the inside face 120 of the wiper cover 36a into which is recessed the supply channel 108 in order to seal against the structure 12 and prevent the escape of lubricant. A gasket 122 also is positioned beneath a shoulder 124 of the adaptor housing 106 tightened against the outer plate 34 of the wiper cover 36a.

An O-ring 107 is employed to seal the adaptor housing 106 within the bore 86a in structure 12. A series of through holes 126 are formed in the wiper cover 36a each centered on the supply channel 108 and sized to receive a respective injector assembly 60 with a substantial clearance therebetween. A hole 128 is also provided to enable insertion of the quick connect fitting 114.

Each of the adaptor housings 106 is formed with a hex shape 130 on the end protruding out of the end wall 88a away from the bearing 20, the hex shape 130 enabling wrenching of the bushing 72 when installing the same into the bores 86a.

Figure 5:
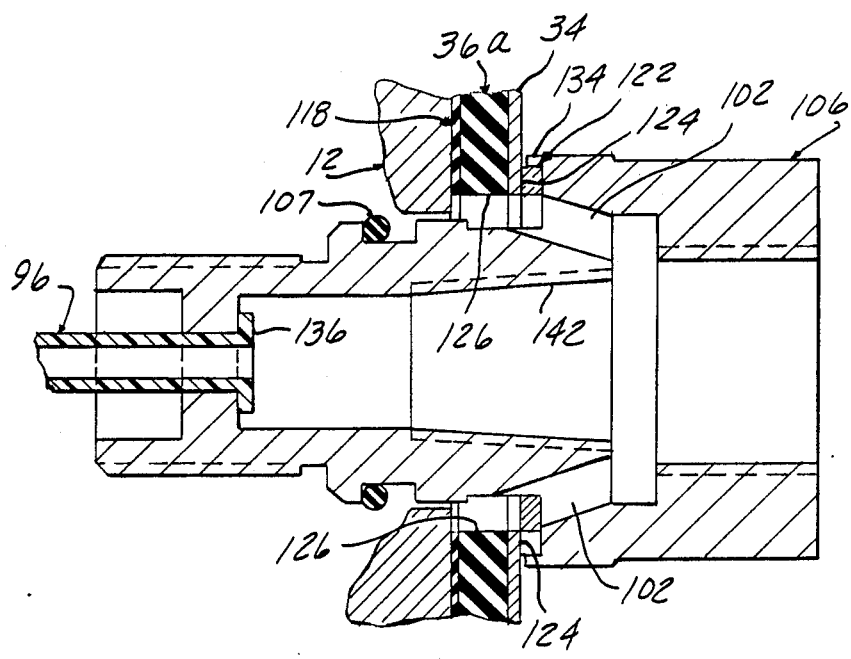
FIG. 5 is an enlarged longitudinal sectional view through an injector assembly housing and adjacent wiper plate and mounting structure.

FIG. 5 shows that the gasket 122 has a large opening 132 so as to clear the openings of the passages 102 and enable lubricant flow. A slight overhang 134 machined at the shoulder 124 enables proper centering of the gasket 122 to ensure such clearance to the hole 126 in the wiper plate 36a. The hole 126 is itself large enough to not block the passages 102.

The injection tube 96 is of plastic, with a flange 136 abutting end wall 138 in which an exit hole 140 through which the main body of the injector tube 96 passes.

The filter-meter element 100 (not shown in FIG. 5) is threaded into a piper thread section 142 of an internal bore 144 receiving that element, which seats against the flange 136 to seal it to wall 138.

Figure 6:
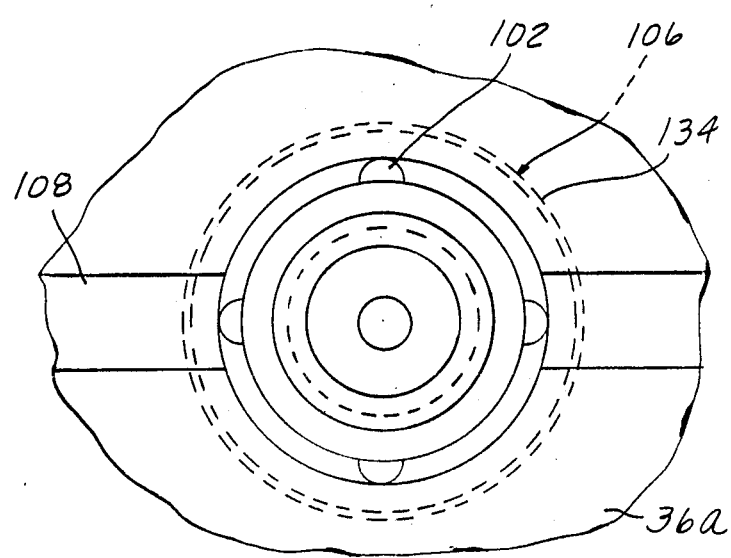
FIG. 6 is an enlarged endwise view of an injector assembly housing and adjacent wiper plate structure.

FIG. 6 shows that lubricant can flow from the channel 108 into the holes 102 in the adaptor housing 106, past gasket 122.

Figure 7:
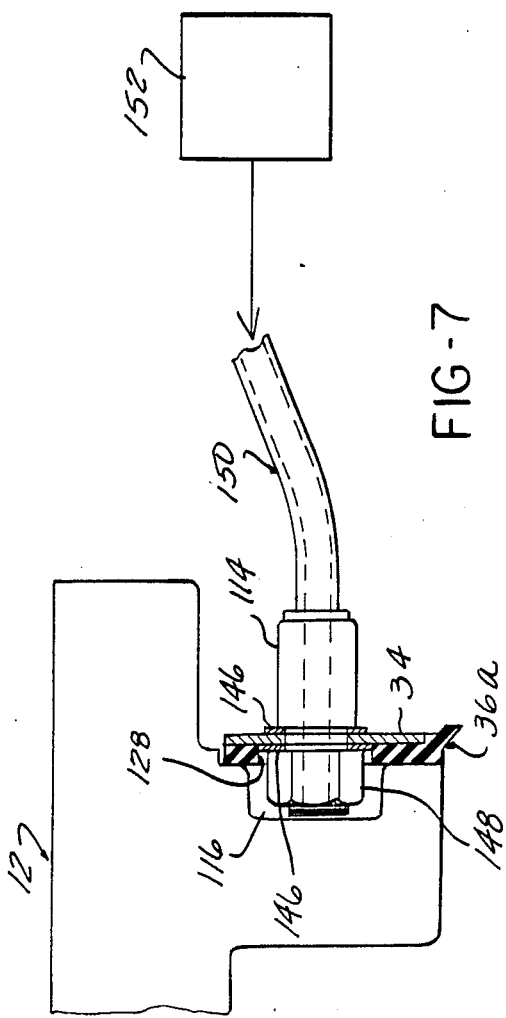
FIG. 7 is a sectional view of a quick connect fitting installed in the wiper plate through a receiving supply chamber in the mounting structure and a block dragrammatic representation of a central lubricant supply.

FIG. 7 shows the installation of quick connection fitting 114 into the supply chamber 116 machined into the structure 12. This is accomplished by clamping the cover plate 34 of the wiper cover 36a between two lockwashers 146 by a nut 148. The quick connect fitting 114 receives a tube 150 from a central lubricant supply 152.

Figure 8:
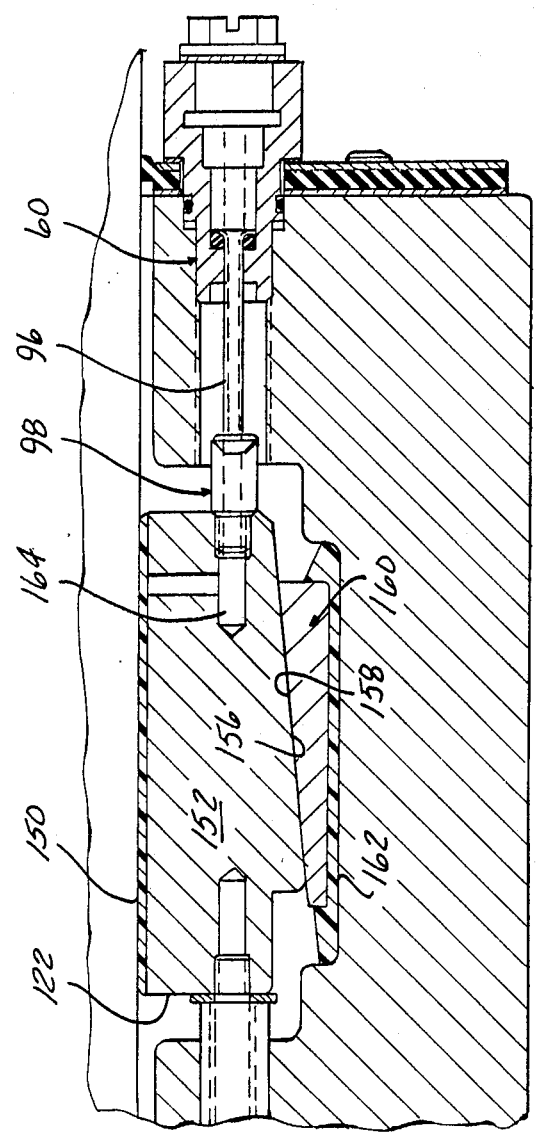
FIG. 8 is a lengthwise section view through an alternate form of bearing incorporating the lubrication system according to the present invention.

FIG. 8 shows the application of the lubrication system to another type of linear bearing in which a layer of bearing material 150 is applied to the face of a bearing block 152 facing a way surface 154. The bearing block 152 is formed with a sloping surface 156 complementary to a sloping surface 158 of a gib plate 160 bedded in a layer 162 of epoxy resin.

The lubrication injector assembly 60 is configured identically to that described above. A bore 164 machined in the bearing block 152 receives the receptor 98 and communicates with a cross passage 166 extending to the layer of bearing material 150.

I claim:

1. In combination, a linear bearing (20) installed in a recess (18) in a structure (12) so as to support said structure (12) on a way surface (38), an adjustment mechanism (58) drivingly interconnecting said structure (12) and said linear bearing (20) to enable lengthwise shifting of the position thereof in said recess (18), a lubrication system for directing lubricant into said linear bearing (20), said lubrication system characterized by a lubricant injector assembly (60) mounted in said structure (12) and having an injector tube (96) extending in a lengthwise direction into said recess (18), said linear bearing (20) having a receptor (98), with said injector tube (96) telescoped into said receptor (98) to accommodate said adjustment of said linear bearing (20) in said recess (18).

2. The linear bearing installation according to claim 1 further including a wiper cover (36a) attached to said structure (12), said wiper cover (36a) characterized by a lubricant supply channel (108) recessed into the inside face thereof, and passage means (102) in said injection assembly (60) communicating with said injector tube (96).

3. The linear bearing installation according to claim 2, further including an injector housing (106) included in said injector assembly (60) said injector housing (106) threaded into a bore (86a) in said structure (12) and passing through a hole (126) in said wiper cover (36a).

4. The linear bearing installation according to claim 3 further including a filter-metering element (100) disposed in said injector housing (60) filtering and metering the flow of lubricant through said injector assembly (60); an end cap (104) threaded into said injector housing (60) at an end exposed out of said structure (12) enabling removal and servicing of said filter-metering element (100).

5. The linear bearing installation according to claim 2 wherein a plurality of linear bearings (20) are mounted in respective recesses (18) in said structure (12), and further including a plurality of lubricant injector assemblies (60) each having an injector tube (96) associated with a respective receptor (98) of each linear bearing (20), said supply channel (108) extending to each of said injector assemblies (60).

6. The linear bearing installation according to claim 2 further including a quick connect supply fitting (114) mounted to said wiper cover (36a) and communicating with said supply channel (108) to enable directing a flow of lubricant into said supply channel (108).

* * * * *